Feb. 10, 1959 W. A. ESCHENBURG 2,872,957
TABLE AND FENCE ADJUSTING MEANS FOR A JOINTER
Filed Dec. 24, 1956 3 Sheets-Sheet 1
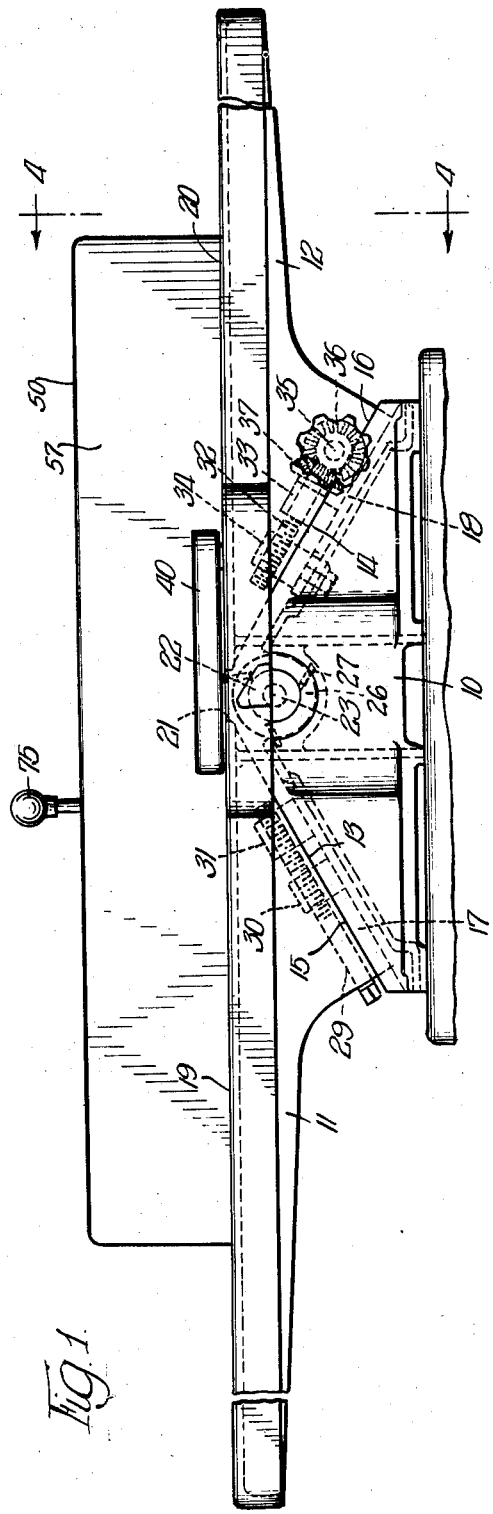
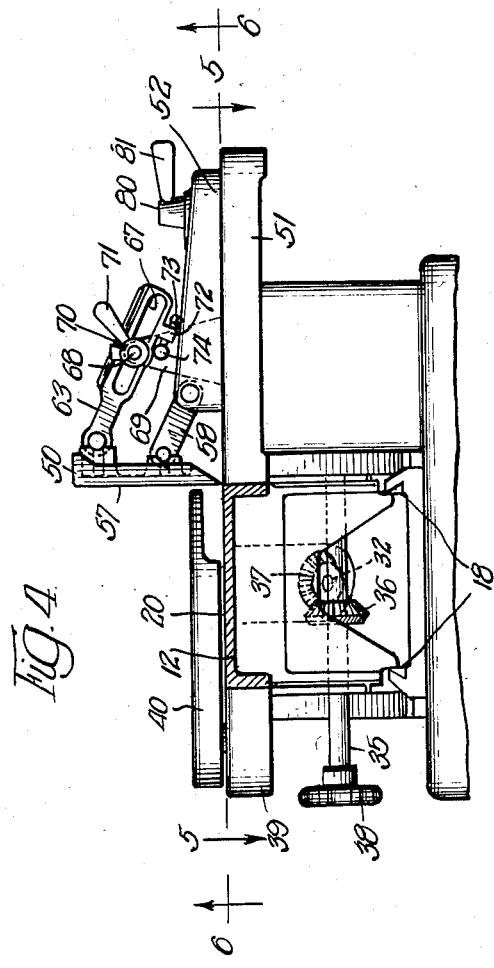
INVENTOR.
William A. Eschenburg,
BY
Cromwell, Greist & Warden
Attys

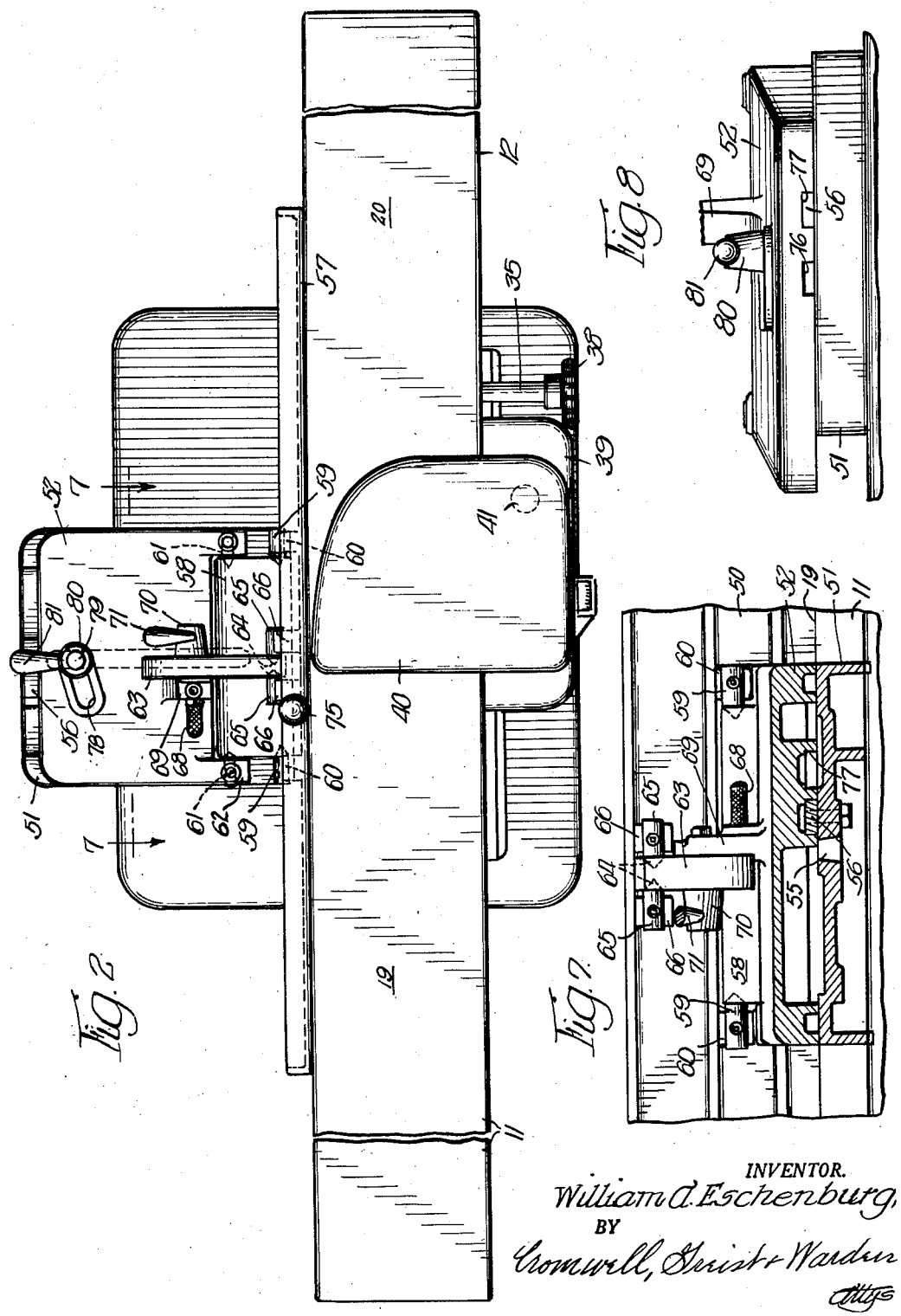

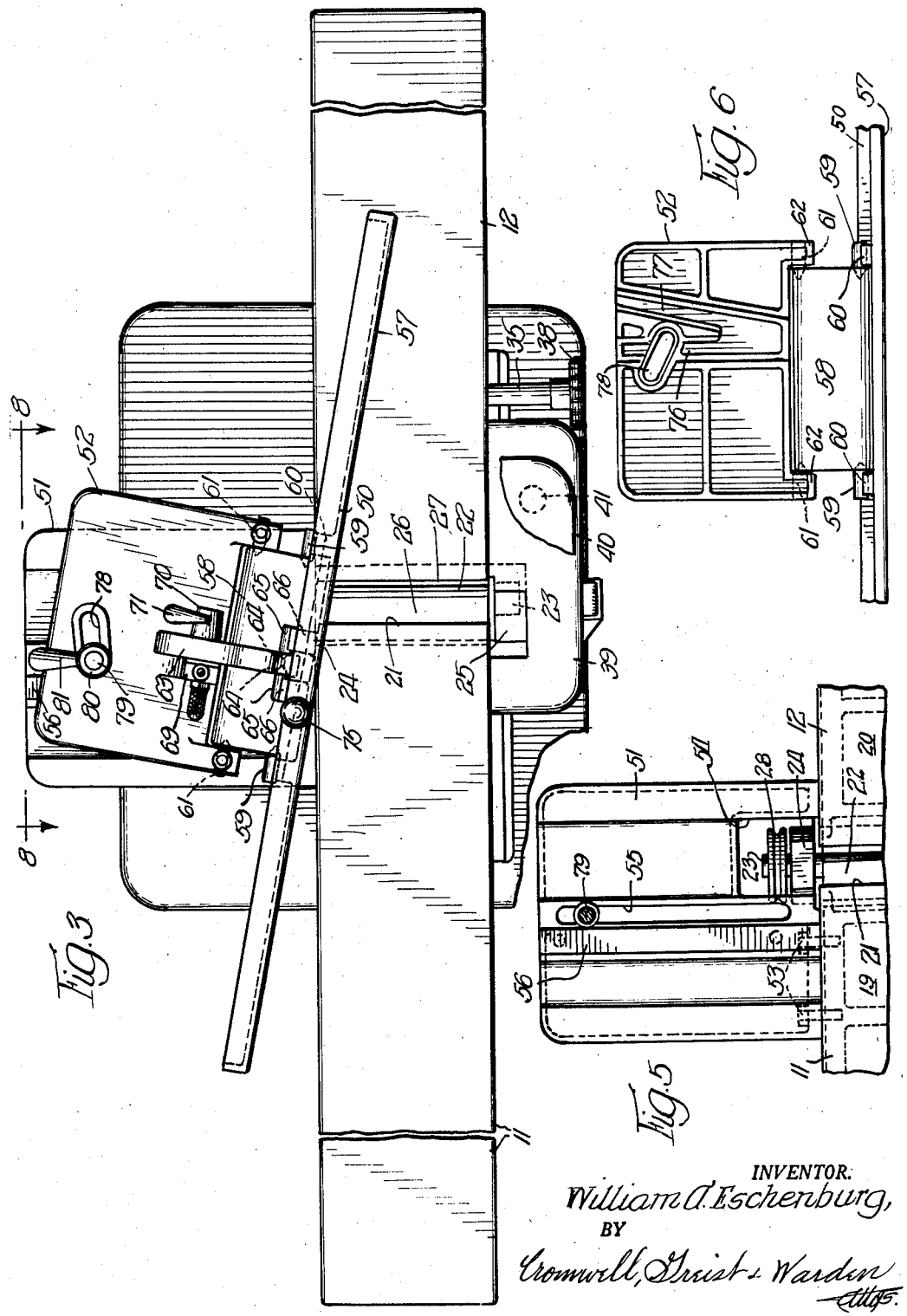

United States Patent Office 2,872,957
Patented Feb. 10, 1959

2,872,957

TABLE AND FENCE ADJUSTING MEANS FOR A JOINTER

William A. Eschenburg, South Beloit, Ill., assignor to Yates-American Machine Company, Beloit, Wis., a corporation of Delaware Application December 24, 1956, Serial No. 630,299

5 Claims. (Cl. 144—253)

This invention relates to power driven tools and is more particularly concerned with improvements in a jointer for performing various operations on wood or similar materials.

It is a general object of the invention to provide an improved jointer wherein the path along which the work is advanced to the cutting knives or blades for the cutting operation may be changed to vary the angle, in a direction transverse to the work piece, at which the blades strike the surface of the work piece, whereby more efficient and more uniform cutting of the material of the work piece may be obtained.

It is a more specific object of the present invention to provide a jointer which is constructed so that the work piece may be advanced over the work table, for engagement by the cutting blades, in a longitudinal path which extends at an angle to the longitudinal axis of the work table so that the cutting blades engage the work on transverse lines which are diagonal relative to the axis of rotation of the blades and a shear cut is obtained.

It is another object of the invention to provide a jointer wherein a blade-carrying cylindrical cutter head is rotatably mounted, with its axis extending transversely of the machine, in a tool slot provided between the spaced horizontal work supporting table members, which table members are arranged in end to end relation with the forward table being adjustable vertically to vary the depth of cut, and wherein an upright fence is adjustably mounted above the tables to guide the work piece in a path extending longitudinally of the table, which fence is mounted so that it may be arranged to guide the work piece in a longitudinal path perpendicular to the axis of rotation of the cutter head as the work piece is advanced across the tool slot so that the cutting edges of the blades engage the work on lines which extend perpendicular to the path of advancing movement of the work piece or the fence may be arranged to guide the work piece in a longitudinal path which extends diagonally across the tool slot so that the cutting edges of the blades engage the work on lines which extend diagonally relative to the path of advancing movement of the work piece.

It is a further object of the invention to provide in a jointer which is characterized by fixed and movable table sections which are arranged in aligned end to end relation on opposite sides of a cylindrical cutter head and which provide cooperating work supporting surfaces in parallel horizontal planes, with the cutter head having its axis of rotation extending transversely between the adjacent ends of the table sections and substantially perpendicular to the longitudinal center line of the table sections, a work fence adjustably mounted for cooperation with the table sections which provides an upwardly extending work engaging surface for guiding a work piece in a longitudinal path to subject the lower surface to a cutting operation by knives carried on the cutter head, the fence having a base forming member extending from its lower edge in a lateral direction outwardly of the work engaging surfaces, which is received on a supporting bracket extending outwardly of the table sections, and interengaging members on the bracket and base whereby the fence may be positioned with the work engaging surface thereof in a plane extending parallel with the longitudinal center line of the table sections, or it may be positioned at an angle thereto, to provide for movement of the work piece relative to the cutter head, so that, a straight cut or a shear cut may be obtained by adjustment of the angular position of the fence.

These and other objects and advantages of the invention will be apparent from a consideration of the jointer construction which is shown by way of illustration in the accompanying drawings wherein:

Fig. 1 is a side elevation of a jointer having incorporated therein the principal features of the invention;

Fig. 2 is a plan view of the jointer with the work guiding fence thereof arranged to guide the work in a path extending parallel to the longitudinal axis of the machine;

Fig. 3 is a plan view of the jointer with the work guiding fence arranged to guide the work in a path extending at an angle relative to the longitudinal axis of the machine, and with portions broken away;

Fig. 4 is a vertical cross section taken on the line 4—4 of Fig. 1;

Fig. 5 is a partial horizontal cross section taken on the line 5—5 of Fig. 4;

Fig. 6 is a view of the bottom of the work guiding fence and its mounting plate, the view being taken on the line 6—6 of Fig. 4;

Fig. 7 is a cross section taken on the line 7—7 of Fig. 2, to an enlarged scale; and Fig. 8 is a partial side elevation on the line 8—8 of Fig. 3, to an enlarged scale.

Referring to the drawings, there is illustrated a jointer having a central member or base section 10, of inverted V-shape, on which two table forming work supporting sections 11 and 12 are supported in aligned end to end relation. The table forming members 11 and 12 are formed at their adjacent ends with oppositely directed downwardly divergent bottom faces 13 and 14 having guide rail formations which engage in sliding relation with cooperating guideway formations in the downwardly divergent top faces 15 and 16 of the base member 10, forming therewith interengaging sliding dovetail connections 17 and 18 (Figs. 1 and 4). The rearwardly disposed table member 11, which is referred to as the fixed table, is arranged to provide an elongate generally rectangular work supporting top surface 19 which, in the normal operating position of the machine, is in a horizontal plane. The forwardly disposed table member 12, which is referred to as the movable table, is provided with a similar elongate rectangular top work supporting surface 20 which is also in a horizontal plane. The interengaging top and bottom faces 13, 15 and 14, 16 of the base 10 and tables 11 and 12 are all at the same angle of inclination to the horizontal so that the work surfaces 19 and 20 are at all times held in parallel horizontal planes regardless of the adjustment of the table members 11 and 12 relative to the base member 10. The table members 11 and 12 are arranged with the adjacent ends of the work supporting surfaces 19 and 20 spaced a sufficient distance to provide a work slot 21 for accommodating a rotatable cutter head 22. The cutter head 22 is mounted on a cross shaft 23 which is supported at its opposite ends in bearings 24 and 25 (Figs. 3 and 5) provided on the top center portion of the base member 10. The cross shaft 23 extends transversely of the machine and is perpendicular to a vertical plane on the longitudinal axis of the table members 11 and 12 and parallel with the work supporting surfaces 19 and 20 thereof. The cutter head 22 comprises a cylindrical member 26 having a series of cutting knives or blades 27 which are secured in axially extending slots therein with their cutting edges extending parallel to the axis of the supporting shaft 23. The shaft 23 is extended at one end and provided with a pulley 28 (Fig. 5) which is adapted to be connected by a drive belt to a drive motor or other suitable power plant (not shown).

The rear or fixed table member 11 is mounted on the base 10 so that it may be initially adjusted relative to the base 10 to bring the top work supporting surface 19 into a horizontal plane which is tangent to the outer periphery of the path of the cutting edges of the knives 27. The table 11 may be connected to the base 10 by means of an adjustment screw or shaft 29 which is journaled for rotation about its longitudinal axis in a bracket member or boss 30 on the table member 11 and has its threaded inner end engaged in a threaded bore in a bracket member or boss 31 fixed on the base 10. The adjusting screw 29 is shaped at its lower end to receive a wrench or other turning tool so that it may be rotated to slide the table 11 up or down as required for proper adjustment relative to the path of operation of the cutting blades 27 on the cutter head 22. The forward or movable table member 12 is supported on the base 10 so that it may be readily adjusted to vary the elevation of the work surface 20 relative to the top of the path traversed by the cutting edges of the knives 27 and the plane of the work surface 19 on the fixed table member 11 so as to vary the depth of cut as desired. The movable table member 12 is connected to the base member 10 by means of an adjusting screw or shaft 32 (Figs. 1 and 4) which is journaled in a bracket or boss 33 on the table member 12 and has its inner end engaged in a threaded bore in a bracket or boss 34 provided on the base 10. Rotation of the adjusting screw 32 is controlled by a transversely extending cross shaft 35 journalled in the side walls of the table and having a bevel gear 36 connecting with a cooperating bevel gear 37 on the end of the screw 32 and being provided with an operating handle or knob 38 on one end thereof which extends laterally of the table. By rotation of the knob 38 the height of the table may be adjusted and the depth of cut may be varied.

The movable table member 12 is provided with a side arm member 39 which is secured at the outside edge thereof and has a portion extending beyond the cutter head 22 a short distance along the edge of the fixed table member 11 with its top surface being in the same plane as the top work supporting surface 20 of the table 12 and being movable therewith to support a work piece for rabbeting cuts. A guard plate 40 is preferably provided for covering the cutter head 22 which is pivotally mounted at 41 and may be spring urged for lateral swinging movement toward the inside of the tables.

A work guiding fence 50 is mounted on the machine by means of a laterally extending bracket forming arrangement which comprises a relatively fixed base support member 51 (Figs. 3 to 8) and a fence mounting bracket member 52 which is adjustably supported thereon. The base member 51 preferably comprises a rectangular bracket forming plate or casting which is secured in laterally extending relation to the fixed table member 11 by the bolts 53 or other fastening means so that it is in relatively fixed rigid position. The base member 51 is cut out at 54 to accommodate the drive pulley 28 on the end of the cutter head shaft 23. It is provided on its uppermost face and intermediate the forward and rearward side edges with a guide slot 55 and a guide rib or bar 56 (Figs. 5 to 8). The slot 55 and the rib 56 are adjacent each other and extend in parallel relation in a direction transverse to the longitudinal axis of the table members 11 and 12 and parallel with the axis of the cutter head shaft 23. The base member 51 receives, in adjustably mounted relation thereon, the fence mounting bracket 52 which in turn carries the guide fence 50.

The guide fence 50 has a work engaging face 57 of generally rectangular shape and of substantially greater length than height, and is arranged with the face 57 in upstanding relation to the horizontal work supporting surfaces 19 and 20 of the table members 11 and 12. It is connected with the mounting bracket 52 by a link plate member 58 of generally rectangular shape. The link member 58 is pivotally connected to the fence 50 at the corners adjacent its inner edge by means of bearing pins 59 which are mounted in longitudinally spaced relation on bosses 60 provided adjacent the lower edge on the rear face of the fence 50. The link plate 58 is pivotally connected at the corners adjacent its outer edge to the mounting bracket 52 by a pair of similar bearing pins 61 which are secured in opposed spaced relation in bearing ears 62 on the inner end of the mounting bracket 52. The bearing pins 59 and 61 have truncated tapered ends which are received in suitable bearing sockets or recesses in the end edges of the connecting link plate 58 so that the latter forms a pivoted link connection between the bottom edge of the fence 50 and the horizontally positioned mounting bracket 52.

The fence 50 is further connected to the mounting bracket 52 by an elongate tilt adjusting link bar 63 which is provided at its inner end with bearing recesses 64 for receiving the ends of pivot pins 65 which are secured on bosses 66 arranged in spaced relation adjacent the top edge of the fence 50 and centered relative to the bosses 60 on the lower edge of the fence. The tilt adjusting link 63 is provided with an elongate slot 67 (Fig. 4) at its outer end which is adapted to receive in sliding relation therein the stem portion of a lock bolt 68 which has one end secured in the upper end of an upstanding boss or bracket arm 69 on the top of the mounting plate 52. The locking bolt 68 carries a locking nut 70 at its other end which has a handle portion 71 for manually rotating the same to clamp the link bar 63 in the desired position. A depending lug formation 72 is provided on the lower face of the link bar 63 which carries an adjustable stop screw 73 positioned to engage with a stop pin 74 projecting laterally of the bracket arm 69 to provide a limit stop for tilting movement of the fence 50 in the direction to position the same with the work engaging surface 57 in a vertical plane perpendicular to the horizontal work surfaces 19 and 20 of the table members 11 and 12. With this arrangement for connecting the fence 50 to the mounting plate 52 the fence may be tilted to position the work engaging surface 57 in a plane extending at an angle to the horizontal planes of the working supporting surfaces 19 and 20 for bevel cuts. The fence 50 may be provided with an upstanding handle member 75 for facilitating the manual positioning of the same.

The mounting plate 52 is attached to the supporting base member 51 so as to permit either parallel or angular positioning of the fence 50 relative to the longitudinal center line of the table members 11 and 12 as well as sliding adjustment of the fence in the transverse direction relative to the long axis of the table members 11 and 12. The mounting plate 52 is provided on its lower face with two elongate transversely extending recesses or guideways 76 and 77 which are at an angle to each other. The guideway 76 extends perpendicular to the lengthwise dimension of the face 57 of the fence 50. The guideway 77 is immediately adjacent to the guideway 76 and extends outwardly at an angle to the guideway 76. The mounting plate 52 may be positioned on the base plate 51 with the guide bar 56 received in either the guideway 76 or the guideway 77. When the mounting plate 52 is positioned with the guide bar 56 received in the guideway 76, the fence 50 is positioned with the work guiding surface 57 in a plane extending parallel to the longitudinal axis of the table members 11 and 12 and perpendicular to the axis of the cutter head shaft 23. When the mounting plate 52 is arranged on the base member 51 with the guide bar 56 seated in the guideway 77 thereof, the fence 50 is positioned with the work guiding surface 57 in a plane extending at an angle of approximately 10 degrees relative to the longitudinal axis of the table members 11 and 12 which results in the edges of the blades 27 on the cutter head 22 striking the bottom surface of a work piece which is advanced along the fence 50 on a diagonal so that a shear cut is obtained.

Provision is made for locking the fence mounting plate 52 in adjusted position on the support member 51 which comprises an arcuate slot 78 in the mounting plate 52, adjacent the outer edge thereof, and a locking or clamping bolt 79 having its stem extending in sliding relation in the slots 55 and 78 and provided on its threaded top end with a clamping nut 80 having an operating handle 81 so that the plate 52 may be locked in the desired lateral position and in either of its two positions relative to the transverse axis of the machine.

In operating the jointer, the table 12 is adjusted vertically by operation of the adjusting knob 38 to position the work surface 20 for the desired depth of cut. The guide fence 50 may be located as desired by adjusting the position of the fence mounting plate 52 relative to the support member 51. The mounting plate 52 may be arranged with the guide bar 56 received in the slot 76, as shown in Fig. 2, when a straight cutting action is desired or it may be arranged with the guide bar 56 positioned in the slot 77, as shown in Fig. 3, when a shear cut is desired. The mounting plate 52 may be adjusted transversely of the machine to position the fence 50 in the desired location in the transverse direction to cause the work piece to travel across the work slot 21 when it is moved along the fence 50 so that it will be engaged by the cutter blades 27 for the cutting operation. The mounting plate may be clamped in rigid relation by operation of the clamping nut 80 and bolt 79 when it is adjusted to the position desired. When a bevel cut is desired, the fence 50 may be tilted toward the mounting plate 52 by adjusting the bar 63 to position the fence 50 at the angle desired.

While specific materials and particular details of construction have been referred to in describing the illustrated machine, it will be understood that other materials and different details of construction may be resorted to within the spirit of the invention.

I claim:

1. In a jointer for material cutting operations which is characterized by fixed and movable table sections having work supporting surfaces arranged on opposite sides of a rotatably mounted cylindrical cutter head which has its axis of rotation extending parallel to said work supporting surfaces and transversely of the longitudinal axis thereof, said cutter head having cutting blades with the cutting edges parallel to the axis of rotation of the head, an elongate guide fence having a work guiding surface which extends in a longitudinal direction along said table sections, and a mounting means for said guide fence comprising a support bracket attached to one side of the fixed table section and having a top horizontal surface in the same plane as the work surface of said fixed table section, a guide bar fixed on the top surface of said support bracket and extending parallel with the axis of rotation of said cutter head, and a mounting plate having the guide fence pivotally connected thereto, said mounting plate having a bottom surface for slidably engaging the top surface of said support bracket, said bottom surface having a guide groove for receiving said guide bar which guide groove extends perpendicular to the longitudinal axis of the work guiding surface on said fence, and said bottom surface having a second guide groove for receiving said guide bar which second guide groove is inclined relative to said first guide groove, whereby said mounting plate may be adjusted on said support bracket for positioning the longitudinal axis of the work surface of said fence either perpendicular to the axis of the cutter head or diagonal relative thereto.

2. In a wood cutting jointer wherein a cylindrical cutter head having peripherally spaced blades is rotatably mounted in a transverse tool slot between adjacent ends of fixed and movable table sections, said table sections having horizontal work supporting surfaces, one of which is adjustable in a vertical direction relative to the other so that a work piece moved along the work supporting surfaces and in a longitudinal direction across the tool slot will be cut by the blades on said cutter head, a work guiding fence adapted to be positioned to extend upwardly above said work supporting surfaces, a support for said fence comprising a bracket member on the one table section and a mounting plate movably positioned on said bracket member, said mounting plate having the fence secured thereto, said bracket member having a horizontal upper face with an elongate slot and an elongate guide bar fixed thereon which projects above the face and which extends normal to the longitudinal axis of the work supporting surfaces on the table sections, said mounting plate having a lower face adapted to seat on the upper face of said bracket member and said lower face having open ended grooves which extend at angles to each other across said mounting plate, one of said grooves being at right angles to the work engaging face of said fence, said mounting plate having a slot positioned to extend across the slot in the bracket member when the mounting plate is seated on said bracket member and a clamping bolt extending through said slots whereby said fence may be adjusted to guide the work over said work supporting surfaces in a path extending perpendicular to the axis of rotation of the cutter head or in a path extending diagonally across the same.

3. In a jointer wherein a cylindrical cutter head having peripherally spaced blades is rotatably mounted in a transverse tool slot between fixed and movable table sections having horizontal work supporting surfaces, the movable table section being adjustable in a vertical direction relative to the fixed section so that a work piece moved in the longitudinal direction along the work supporting surfaces and across the tool slot will be cut by the blades on said cutter head, a work guiding fence adapted to be positioned to extend upwardly above said work supporting surfaces and in a generally longitudinal direction across said tool slot, a mounting bracket for said work guiding fence extending laterally of said fixed table section and having a guide forming rib extending from the upper face thereof in a direction parallel with the axis of rotation of said cutter head, a mounting plate adjustably positioned on said mounting bracket and having said work guiding fence pivotally secured thereto, said mounting plate having guideway forming grooves in the bottom face thereof for cooperation with said guide forming rib, said guideway grooves extending transversely relative to said work guiding fence and in angular relation to each other, and means to clamp said mounting plate on said mounting bracket with said guide web seated in one of said guideway forming grooves whereby said fence may be adjusted to guide the work in a path extending perpendicular to the axis of rotation of the cutter head or in a path extending diagonally across the same.

4. In a jointer for material cutting operations which is characterized by fixed and movable table sections arranged to provide work supporting surfaces in parallel horizontal planes on opposite sides of a rotatably mounted cylindrical cutter head having the axis of rotation thereof in a vertical plane extending transversely of the horizontal axis of said work supporting surfaces and parallel thereto, said cutter head having cutting blades mounted thereon with the cutting edges parallel to the axis of rotation of the head, an elongate guide fence having a work guiding surface which extends in a longitudinal direction along said work surfaces of said table sections and upwardly thereof, and mounting means for said guide fence comprising a support bracket at one side of the table sections having a top horizontal surface and a guide bar thereon extending parallel with the axis of rotation of the cutter head, and a mounting plate having the guide fence attached thereto, said mounting plate having a bottom surface for sliding engagement with the top surface of said support bracket, said bottom surface having a groove for receiving said guide bar which groove extends perpendicular to the longitudinal axis of said work guiding surface on said fence and having a second groove for said bar which is inclined in the horizontal direction to the longitudinal axis of said work guiding surface, whereby said mounting plate may be adjusted to slide on said support bracket for positioning the work guiding surface to extend with the longitudinal axis thereof either perpendicular relative to the axis of the cutter head or diagonally relative thereto.

5. In a jointer for cutting wood or like material wherein a cylindrical cutter head having peripherally spaced blades is rotatably mounted on a horizontal axis in a tool slot provided between fixed and movable table sections having longitudinally aligned horizontal work supporting surfaces which are adjustable in a vertical direction relative to each other so that a work piece moved in a longitudinal direction along the work supporting surfaces and across the tool slot will have its bottom surface cut by the blades on said cutter head, a work guiding fence, means to support said fence with the work engaging surface extending upwardly and in a generally longitudinal direction above said work supporting surfaces, said fence supporting means comprising a mounting bracket fixed relative to one of said table sections and a mounting plate secured on said bracket for adjustment laterally of said work supporting surfaces and about a vertical axis, said mounting plate having said fence pivotally secured thereto for tilting adjustment, said mounting bracket and said mounting plate having mating surfaces extending in a generally horizontal plane, one of said mating surfaces having a projecting rib and the other one of said surfaces having a plurality of angularly related cooperating grooves for selectively receiving said rib, said rib and a cooperating one of said grooves extending in a direction normal to the longitudinal axis of the work supporting table surfaces and the work engaging surface of said fence, respectively, whereby said fence may be selectively adjusted to guide the work along said work supporting surfaces in a path which extends perpendicular to the axis of rotation of the cutter head or in a path which extends diagonally across the same.

References Cited in the file of this patent

UNITED STATES PATENTS

| | | |
|---|---|---|
| 387,428 | Luther | Aug. 7, 1888 |
| 878,911 | Thomas | Feb. 11, 1908 |
| 2,099,519 | Hedgpeth | Nov. 16, 1937 |
| 2,109,061 | Dietrich | Feb. 22, 1938 |
| 2,123,627 | Hedgpeth | July 12, 1938 |
| 2,285,891 | Campbell | June 9, 1942 |
| 2,619,998 | Okamuro | Dec. 2, 1952 |
| 2,752,960 | Poeltl | July 3, 1956 |

FOREIGN PATENTS

| | | |
|---|---|---|
| 293,889 | Germany | Sept. 2, 1916 |